April 22, 1958

W. R. COLLINGS ET AL 2,831,611

TAPE MAKING MACHINE

Filed Dec. 24, 1952

INVENTORS
WILLIAM R. COLLINGS &
HAROLD L. BROWNE
BY
William C. Blackburn
Robert F. Fleming, Jr.
Attorneys

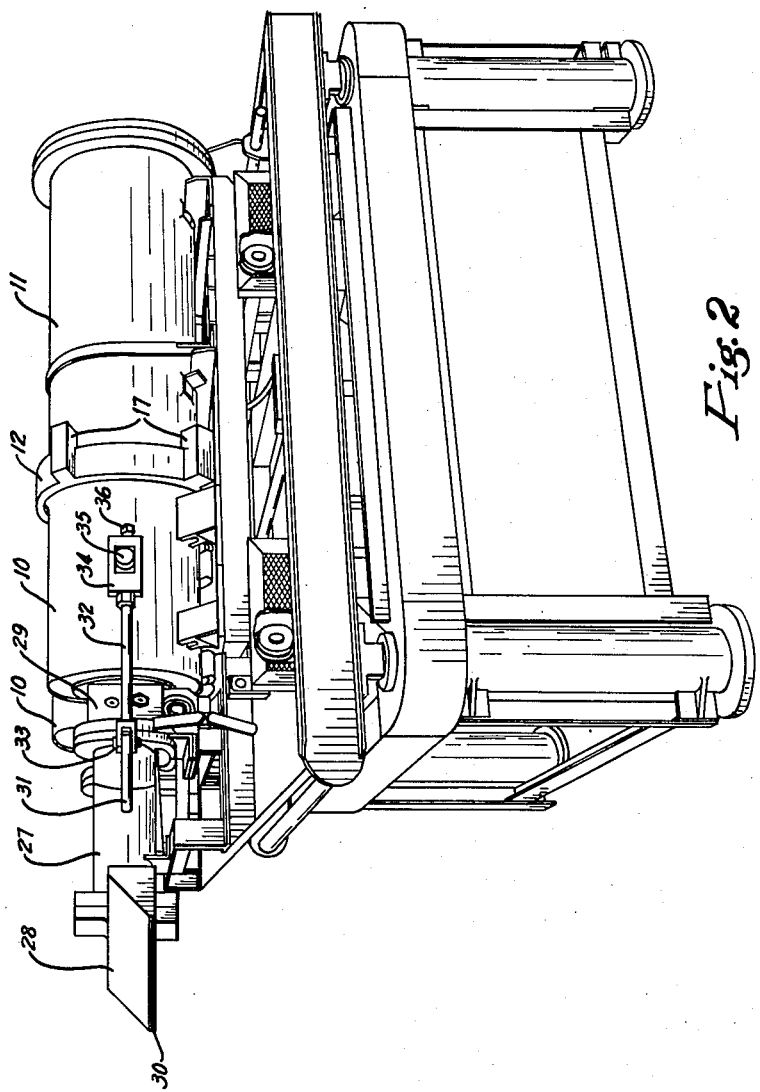

April 22, 1958 W. R. COLLINGS ET AL 2,831,611
TAPE MAKING MACHINE
Filed Dec. 24, 1952 5 Sheets-Sheet 3
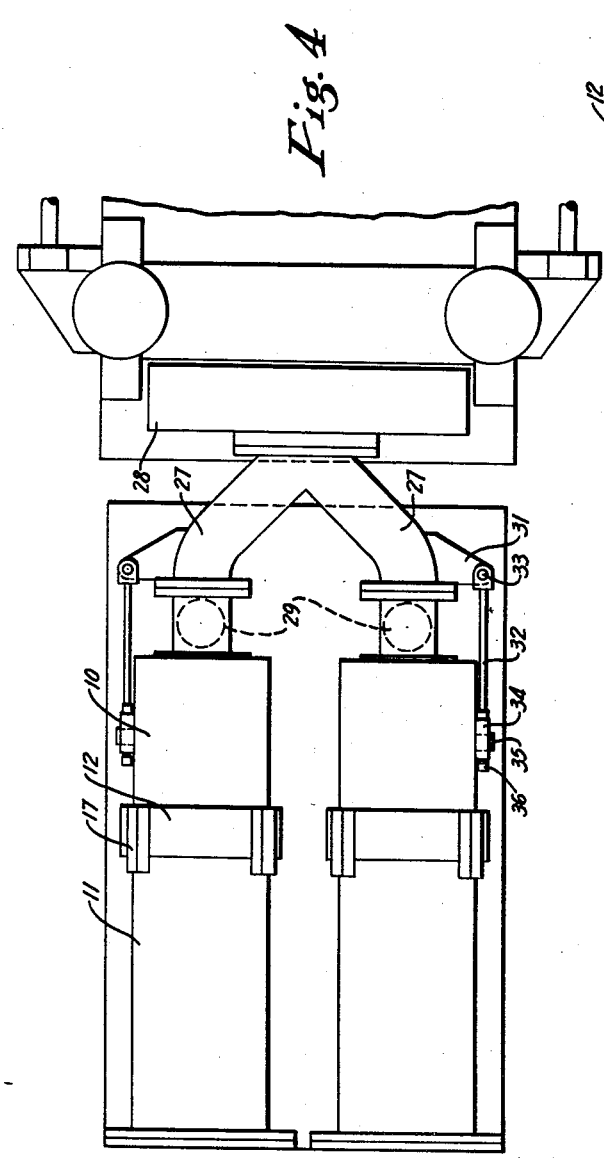
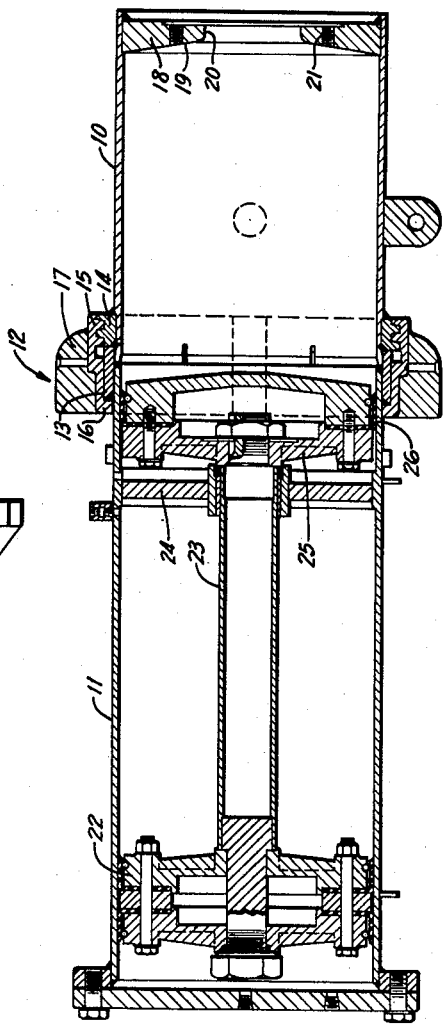
INVENTORS
WILLIAM R. COLLINGS &
BY  HAROLD L. BROWNE
William C. Blackburn
Robert F. Fleming, Jr.
Attorneys

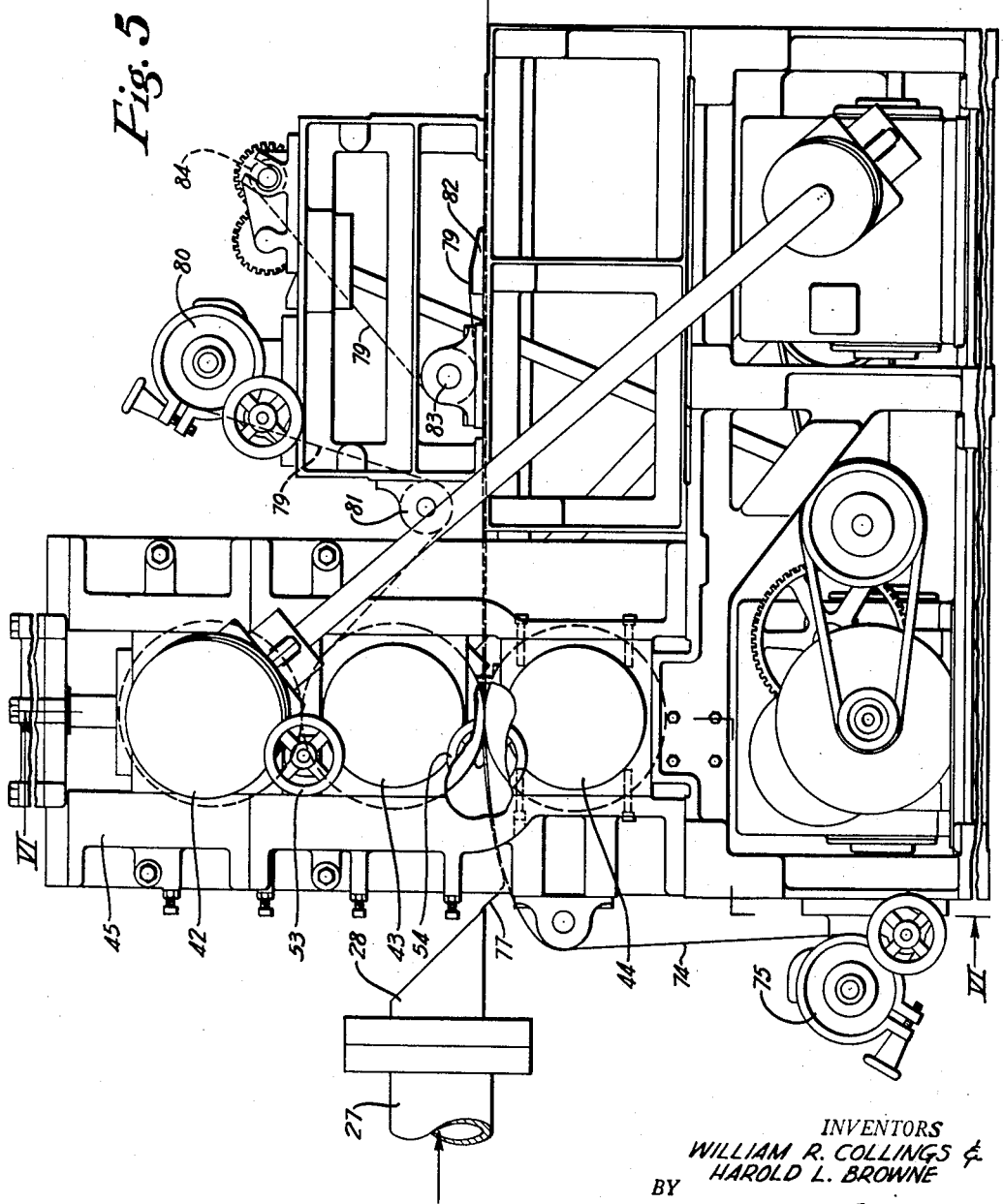

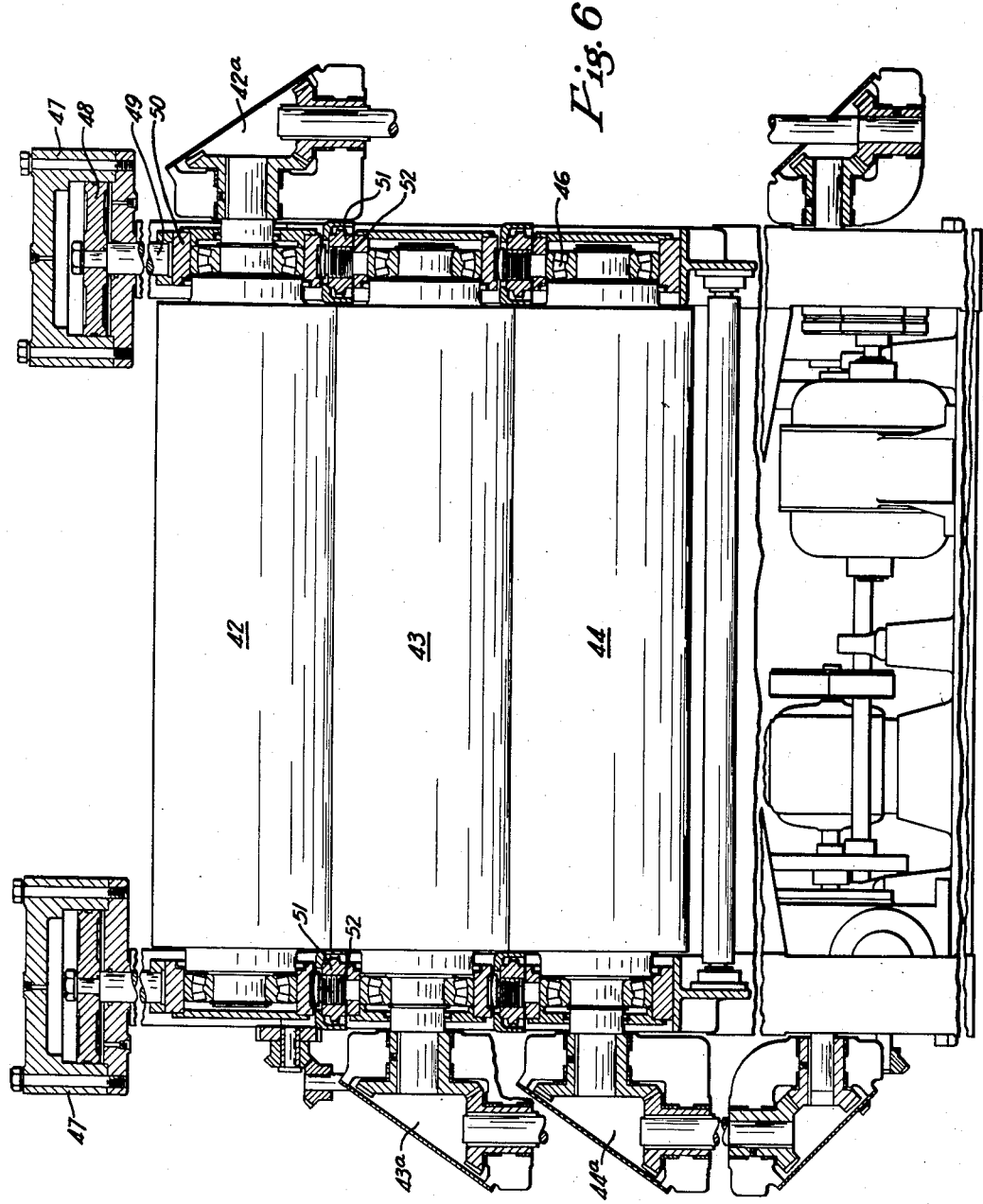

United States Patent Office 2,831,611
Patented Apr. 22, 1958

2,831,611
TAPE MAKING MACHINE

William R. Collings and Harold L. Browne, Midland, Mich., assignors to Dow Corning Corporation, Midland, Mich., a corporation of Michigan Application December 24, 1952, Serial No. 327,894

5 Claims. (Cl. 222—135)

This invention relates to the making of tape formed primarily of a ribbon of partially vulcanized silicone rubber. The invention provides an efficient machine and method for producing such tape.

According to the method of this invention the unvulcanized silicone rubber is first extruded in the form of a thin ribbon having a width that can be economically handled in the machine. This ribbon is then passed through calendering rolls where it is milled, reduced to the desired thickness, and is applied to a web of backing material. The combined web is then passed into a vulcanizing unit where the web passes around heated rolls and the silicone rubber is partially vulcanized. The tape is then removed from the vulcanizing unit and is slit into the width desired for the finished tape.

The machine of the invention provides efficient and economical apparatus for continuously carrying out the method outlined above.

These, and other objects and advantages of the invention, will become apparent as the description proceeds.

In the drawings:

Fig. 2 is a perspective view of the paste distributor.

Fig. 3 is an enlarged longitudinal section through the piston cylinder and the supply drum.

Fig. 4 is a diagrammatic plan view of the paste distributor and part of the calendering unit.

Fig. 5 is a side elevation of the calendering unit.

Fig. 6 is a front elevation of the calendering unit.

Figure 1:
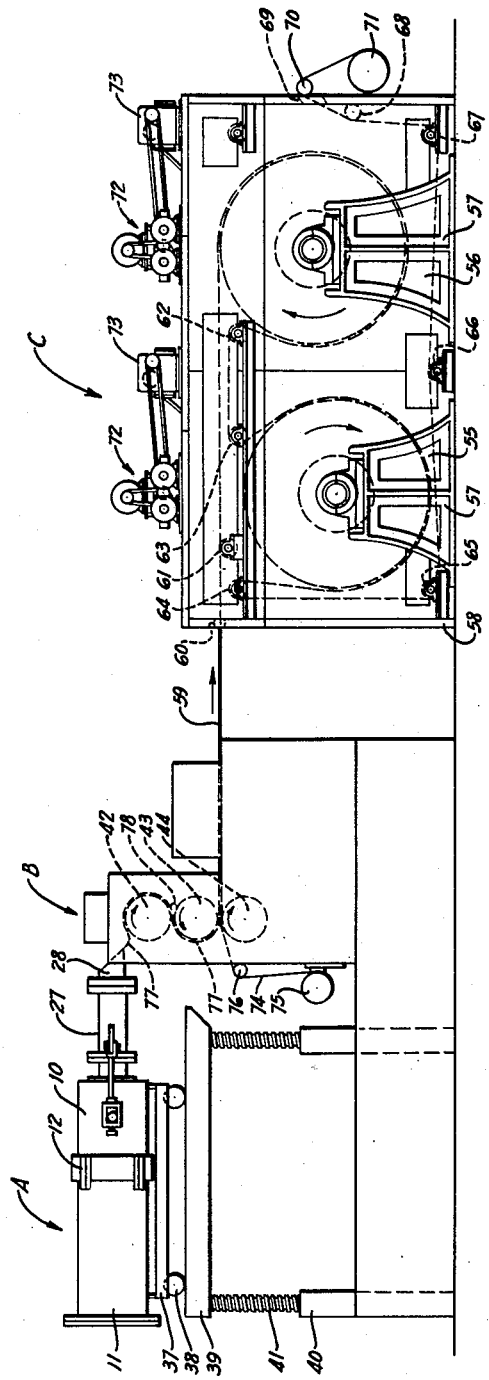
Fig. 1 is a diagrammatic side elevation of the complete machine.

The invention relates to the manufacture of tape which consists primarily of a ribbon of unvulcanized, compounded silicone rubber. The present invention is not concerned with the composition of the silicone rubber, but in a preferred species the rubber includes a base which may be a di-organo polysiloxane, a vulcanizing agent which may be an organic peroxide, and a filler which may be a heat-stable inorganic filler of any suitable type. These materials are compounded to form a paste having the consistency of soft putty. (65 mils on the Williams plasticity scale.)

This rubber paste is uncured when it enters the machine of the present invention, and after it has been rolled into suitable thickness for tape, it is partially cured on vulcanizing rolls, so that after it leaves the machine it remains "tacky."

The tape is adapted to be wrapped around tubes or wires that become hot, and the final curing of the silicone rubber takes place after the tape is in place and become heated during use on the tubes or wires. The fact that the tape is "tacky" before wrapping in place causes it to adhere while being wrapped, and after it is in final position, the natural heat of the tube or wire vulcanizes it to form a substantially unitary rubber covering for the tube or wire.

A preferred machine of the invention, as shown in Fig. 1, includes the paste distributor A, the calendering unit B, and the drum vulcanizer C. Attention will first be directed to the paste distributor A, which is shown in Figs. 1, 2, 3 and 4.

A. PASTE DISTRIBUTOR

A pair of supply drums 10 is provided, and each of these supply drums has its open end detachably connected to the front end of a piston cylinder 11 by a detachable connection indicated generally at 12 in Fig. 3. The detachable connection includes a ring 13 welded to the outside of the piston cylinder, a ring 14 welded to the outside of the supply drum, and a connector ring 15. The connector ring carries a flange 16 which engages ring 13 and carries screw threads which mate with corresponding screw threads on ring 14. Lugs 17 on the outside of the connector ring provide means for rotation of the connector ring.

The delivery end of a supply drum is closed by a delivery plate 18 welded to the inner wall of the supply drum, and which has a conical sloping surface 19 leading to a delivery orifice 20. While the supply drum is being transported and prior to its attachment to the machine, the delivery orifice is closed by a suitable plate which is secured by bolts engaging the threaded bolt holes 21.

A piston 22 is fitted within the piston cylinder 11 and is reciprocated by suitable power means, such as hydraulic pressure. A piston rod 23 attached to piston 22 is supported by guide 24 and carries a delivery head 25 provided with suitable packing 26, which fits closely within the supply drum 10 and prevents backward leakage of the soft paste when pressure is applied to the delivery head 25.

It will be clear from Figs. 2 and 4 that a pair of the supply drums 10 and piston cylinders 11 are mounted side by side, and that a delivery tube 27 extends from each supply drum to the inlet opening of the distributor nose piece 28. A rotary gear pump 29 is located in each of the delivery tubes 27. The long extruding slot 30 in the distributor nose piece is adjustable in width so that the thickness of material extruded can be varied according to circumstances.

A bracket 31 is welded to the outside of each of the delivery tubes 27, and a tie rod 32 is hinged at 33 to the bracket. A yoke 34, carried at the outer end of the tie rod, engages over a lug 35 attached to the supply drum, and is tightened into place by an adjusting bolt 36. It will be clear that the tie rods 32 can be detached from the lugs 35 and swung outwardly to permit removal of the supply drum 10. After a new supply drum has been placed in position the tie rods are again attached to the lugs 35 and tightened up to hold the delivery tube 27 tightly against the delivery end of the supply drum 10.

The extruding mechanism, which includes the supply drums 10, piston cylinders 11, and the distributor nose piece 28, is mounted on a frame 37 which carries wheels 38 riding on rails carried by bed plate 39. Bed plate 39 is mounted on support legs 40 which are provided with threaded posts 41. Suitable mechanical means not shown is provided to simultaneously elevate the threaded posts in the support legs so as to vertically move the bed plate 39 to the desired position. Wheels 38 permit reciprocating the frame 37 in a direction parallel to the axis of the supply drums 10 so as to move the delivery distributor nose piece 28 forward to a position adjacent the calendering unit B, or to move it backward away from the calendering unit B.

B. CALENDERING UNIT

The calendering unit B (see particularly Figs. 5 and 6) includes an upper roll 42, a middle roll 43, and a lower roll 44, all mounted in side frames 45. The upper roll 42 is driven by the gear train 42a (see Fig. 6); the middle roll 43 is driven by the gear train 43a; and the lower roll 44 is driven by the gear train 44a. These gear trains are driven by suitable motor and gear mechanism which, since it forms no part of the present invention, will not be described in detail. However, it should be noted that the speed of the middle roll may be adjusted independently of the others. In a preferred type of operation roll 42 rotates at approximately 2.6 R. P. M., while rolls 43 and 44 rotate at 3 R. P. M. The operator may adjust these speeds to prevent wrinkles in the web. Each of the rolls is supported at each end by suitable anti-friction bearings 46.

Fluid cylinders 47 are provided to press the calendering rolls into contact with each other. To apply this pressure, fluid pressure is permitted to press downwardly on the upper surface of the pistons 48 which carry piston rods 49 engaging against the bearing blocks 50. When the parts are in the position illustrated in Fig. 6, if fluid pressure is admitted on the top of the pistons 48, all three rolls will be pressed into contact with each other.

Means is furnished to provide an adjustable clearance between each pair of rolls. The means for adjusting the clearance between rolls 42 and 43 includes a worm gear 51 which has threaded engagement with a stud 52. Rotation of worm gear 51 moves the threaded stud upwardly, causing its head to engage the lower surface of bearing block 50, thus moving the bearing block upwardly, and opening a clearance between rolls 42 and 43. A similar worm gear and threaded stud 52 is provided at each end of roll 43, and the worm gears 51 are operated synchronously by a hand wheel 53 operating a suitable worm shaft. A similar hand wheel 54 operates similar worm gears and studs to create an adjustable clearance between the rolls 43 and 44.

Other features of the calendering unit will be explained in detail in connection with a subsequent explanation of the operation of the machine.

C. DRUM VULCANIZER

The drum vulcanizer C, as indicated in Fig. 1, includes vulcanizing drums 55 and 56. These vulcanizing drums are journaled in supports 57 and are surrounded by a substantially closed cabinet 58, which retains the heat.

The web 59, as it comes from the calendering unit, enters the casing 58 through slot 60, passes over idler roller 61, thence around drum 56 to idler roller 62; thence to idler 63, around drum 55 and then around the following idler rollers in sequence; 64, 65, 66, 67, and 68. After passing over idler 68, the web passes out of the casing through slot 69, around idler roller 70 to take-up roll 71. It should be noted that the idler rollers are so disposed as to cause the web to contact a large portion of the periphery of each of the vulcanizing drums.

Each of the vulcanizing drums is rotated by a drive unit 72 through a reduction gear 73. The drive unit 72 is an electrical differential drive of a known type which insures constant tension on the web. This constant tension helps to keep the web straight and free of wrinkles.

The vulcanizing drums are heated in any suitable manner, as by supplying steam to their interiors. The drums may be heated at temperatures from 170° to 400° F. depending on the type of material being used in the paste. If the paste includes a low plasticity polymer which contains a considerable amount of volatile matter, the web must be cured at a lower temperature and for a longer time in order to avoid the formation of gas bubbles. On the other hand, if the paste includes a high plasticity polymer which contains less volatiles, the web can be cured at a higher temperature and can be passed through the vulcanizing unit at a faster rate.

D. OPERATION

The present invention contemplates the manufacture of either supported or unsupported tape. In supported tape, the unvulcanized silicone rubber is permanently carried and supported by a backing of suitable strong material, while in unsupported tape, the unvulcanized rubber itself constitutes the entire body of the completed tape.

(a) Supported tape

A preferred method of using the machine to manufacture supported tape is illustrated in Fig. 1. In this use of the machine a web of support material 74, which may be an inorganic fabric that will withstand high temperature such as glass fabric, is taken from supply reel 75, passes over idler roll 76, and thence between the middle and lower calendering rolls where it receives a coating of unvulcanized silicone rubber.

Preparatory to starting operations, both of the supply drums 10 were filled with the compounded silicone rubber, and the web of support material 74 is threaded between the calendering rolls 43 and 44. The distributor nose piece is now brought to a position close to the top calendering roll 42 and approximately level with its upper surface. This is done by elevating the bed plate 39 and moving the frame 37 to a forward position in which the nose piece 28 arrives at the desired working position.

Mechanism is now started to deliver the rubber compound from one of the supply drums 10 to the distributor nose piece 28. This is done by supplying hydraulic pressure behind piston 22, causing the delivery head 25 to press the paste from the supply drum 10. Simultaneously, the gear pump 29 associated with this particular supply drum is started into operation. This combination of the delivery head with the gear pumps is found to supply the distributor nose piece 28 with a smooth mass of rubber compound that is free of air bubbles. It has been found impractical to use a conventional screw extruder to supply the rubber compound to the delivery nose piece because this mechanism permits air bubbles to issue from the distributor nose piece, and these in turn tend to cause flaws and defects in the finished tape. It is believed that the rotary gear pump by kneading and working the paste eliminates these air bubbles.

This feeding mechanism provides a uniform bank of paste across the full width of the calendering rolls. If the bank is not uniform, the rolls may be over-stressed at some places, thus springing the rolls. If the paste is delivered to the rolls in separate streams (longitudinal break in the ribbon) flaws will appear in the final tape, since there is not sufficient lateral pressure and mixing to weld the streams together.

The distributor nose piece delivers a ribbon of compounded rubber 77 which is of uniform thickness over the entire width of the calendering rolls. As previously explained, the slot in the distributor nose piece 28 is adjustable, and when using a three-roll operation as illustrated in Fig. 1 the thickness of the ribbon 77 may be approximately $1/32$ of an inch. This ribbon 77 is delivered to the top of the upper calendering roll 42, which is rotating in a clock-wise direction as viewed in Fig. 1. After passing around the right-hand side of upper roll 42, the web 77 passes between rolls 42 and 43, around the left hand surface of roll 43, and thence to the bottom of roll 43 where it is applied to the web 74 of supporting material. In this type of operation the ribbon 77 makes two passes through the calendering rolls, the first pass between rolls 42 and 43, and the second pass between rolls 43 and 44.

Where the ribbon 77 of compounded rubber starts to pass between calendering rolls 42 and 43, an ambulatory bank of rubber compound 78 begins to build up. This ambulatory bank rotates as the calendering rolls rotate, and in this bank the rubber compound is subjected to additional blending and working so as to further remove any air bubbles and produce a smooth, continuous coating free from flaws on the support material 74. This ambulatory bank does milling and as the material passes between the calendering rolls 42 and 43, it is given approximately its final thickness. The final thickness is determined when the ribbon of compounded rubber 77 passes between calendering rolls 43 and 44 and is applied to the support material 74.

The two materials are now combined to form the web 59 which passes into the drum vulcanizer C where the rubber compound is partially vulcanized as previously explained.

The machine may be designed to produce a final web of any suitable width, and it will be understood that all parts of the apparatus including a distributor nose piece 28, the calendering rolls, and the vulcanizing drums are suitably dimensioned to accommodate the desired width of web.

After the wide web of material has been wound on the final take-up reel 71, it may be removed and passed through a suitable slitting machine to slit the web into the width desired for the final commercial tape.

As explained previously, only one of the supply drums 10 is emptied at a time. As soon as the first supply drum is about to be emptied, the mechanism is started to feed the rubber compound from the second drum, so that rubber from the second drum feeds the distributor nose piece 28 while the first drum is being removed from the machine and refilled.

An alternate method of feeding the compounded rubber to the calendering unit is illustrated in Fig. 5, where the distributor nose piece 28 is placed in a lowered position and the web of compounded rubber 77 is fed directly onto the supporting material and passes only between the calendering rolls 43 and 44.

(b) Unsupported tape

The method of forming unsupported tape is similar to the method above described, except that the web 74 of supporting material instead of being an inorganic fabric that is to become a permanent part of the finished tape, is some temporary support material, such as paper coated with polyethylene. This support material is preferably not removed from the tape until it is ready for use.

In some cases it may be desirable to cause a web of protective material to pass between the ribbon 77 of compounded rubber and the calendering rolls. This web may be cellophane or other suitable protective material, which not only keeps the compounded rubber from adhering to the calendering rolls, but also gives a high gloss to the exposed surface of the tape. An arrangement for using a protective material of this type is illustrated in Fig. 5.

As illustrated, the sheet of protective material 79 comes from supply roll 80 and passes around idler roll 81 before passing over the top of calendering roll 43. After passing around the left side of calendering roll 43, the protective material is applied to the upper surface of the ribbon 77 of compounded rubber, and continues in contact with the upper surface of ribbon 77 until the combined layers pass under the breaker bar 82. The breaker bar 82 is a maple knife which has a relatively sharp edge along its right-hand side as viewed in Fig. 5; and the sheet 79 of protective material is stripped back over this sharp edge in order to permit the protective material to be stripped from the relatively soft rubber compound without having the compound adhere to the protective material. After leaving the breaker bar 82 the protective material passes around idler roll 83 and thence to wind-up roll 84 where the protective material may be kept for re-use.

The tape is partially cured

It has been explained above that in all cases the combined web of un-vulcanized silicone rubber and supporting material is passed over the drying drums in a position with the supporting material next to the drum and with the un-covered surface of the silicone rubber exposed to the air within the drying cabinet.

As the result of this arrangement, the side of the rubber next to the supporting material reaches a higher temperature, and is substantially wholly cured, whereas the exposed surface of the rubber reaches a lower temperature, and is only partially cured.

This result, which may be called "differential curing," produces a tape in which the more highly-cured surface is not "tacky" and has a firmer consistency, so that if a permanent backing strip is used, the rubber is substantially vulcanized to the backing strip. If no permanent backing strip is used, then this firmer surface of the tape permits ready stripping of the tape from the temporary backing material, and also facilitates handling of the un-backed tape.

The exposed surface of the tape is only slightly cured and remains "tacky." This tacky surface permits one turn of the tape, when wound, to adhere to the preceding turn and to be vulcanized thereto when the final heat-curing takes place.

E. MODIFICATIONS

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

Thus, instead of using a pair of supply drums 10, only a single drum or supply chamber may be used. Means other than the hydraulically operated delivery head 25 may be used to press the paste from the supply chamber.

The calendering unit preferably has three rolls as illustrated, in order to permit the type of operation illustrated in Fig. 1. But it is possible to use only two rolls, as illustrated in Fig. 5, and for treating certain types of materials it is possible to use more than three rolls if the results justify the additional expense.

Also, in the drum vulcanizer C, instead of the two drums illustrated, only a single drum, or more than two drums may be used, the important consideration being to retain the material within the drum vulcanizer at a temperature and for a length of time sufficient to produce the desired partial curing of the rubber compound.

We claim:

1. A paste distributor which comprises: a distributor nose piece having a long slot of narrow width, a pair of supply drums adapted to be filled with paste, a pair of delivery tubes, each delivery tube leading from a supply drum to the inlet of the distributor nose piece, and a delivery head associated with each supply drum for forcing paste from a cylinder to the distributor nose piece, each supply drum being separate and detachable from its associated delivery head and delivery tube, in which a rotary gear pump is located in each of the delivery tubes, the gear pumps serving to remove air from the paste and to assist in feeding the paste to the distributor nose piece.

2. A paste distributor which comprises: a distributor nose piece having a long delivery slot and an inlet opening, a pair of supply drums adapted to be filled with paste, each supply drum having at one end a delivery orifice and being open at its other end, a pair of piston cylinders, each cylinder being in communication with the open end of a supply drum and having a delivery head adapted to fit closely within a supply drum to force paste from the delivery orifice of the supply drum, and a pair of delivery tubes, each delivery tube leading from the delivery orifice of a supply drum to the inlet of the distributor nose piece, each of the supply drums having a detachable connection with a piston cylinder head and a delivery tube.

3. A paste distributor as specified in claim 2 in which a rotary gear pump is located in each of the delivery tubes, the gear pumps serving to remove air from the paste and to assist in feeding the paste to the distributor nose piece.

4. A paste distributor which comprises a distributor nose piece having a long delivery slot adjustable in width, and an inlet opening, a pair of supply drums adapted to be filled with paste, each supply drum having at one end a delivery orifice and being open at its other end, a pair of piston cylinders, each cylinder having a delivery head adapted to fit closely within a supply drum to force paste from the delivery orifice of the supply drum, and a pair of delivery tubes, each delivery tube leading from the delivery orifice of a supply drum to the inlet of the distributor nose piece, each of the supply drums having a detachable connection with a piston cylinder and a delivery tube, in which paste distributor a rotary gear pump is located in each of the delivery tubes, the gear pumps serving to remove air from the paste and to assist in feeding the paste to the distributor nose piece.

5. A paste distributor which comprises: a distributor nose piece having a long delivery slot of narrow width, and an inlet opening, a supply chamber adapted to be filled with paste, the supply chamber having a delivery orifice, a delivery tube leading from the delivery orifice of the supply chamber to the inlet opening of the distributor nose piece, means to apply pressure to press paste from the delivery orifice of the supply chamber to the delivery tube, and a rotary gear pump in the delivery tube, the gear pump serving to remove air from the paste and to assist in feeding the paste to the distributor nose piece.

References Cited in the file of this patent

UNITED STATES PATENTS

| | | |
|---|---|---|
| 844,350 | Hale | Feb. 19, 1907 |
| 1,951,694 | Goulstone | Mar. 20, 1934 |
| 1,961,182 | Williams | June 5, 1934 |
| 2,054,114 | Abrams et al. | Sept. 15, 1936 |
| 2,054,115 | Abrams et al. | Sept. 15, 1936 |
| 2,109,190 | Coffey | Feb. 22, 1938 |
| 2,145,240 | Adams | Jan. 30, 1939 |
| 2,220,226 | Freudenberg et al. | Nov. 5, 1940 |
| 2,277,313 | Fowler | Mar. 24, 1942 |
| 2,374,069 | Balthis | Apr. 17, 1945 |
| 2,424,856 | Schnuck | July 29, 1947 |
| 2,634,888 | Sherbondy | Apr. 14, 1953 |
| 2,671,580 | Henson | Mar. 9, 1954 |
| 2,736,480 | Anderson | Feb. 28, 1956 |

OTHER REFERENCES

Uses and Processing of Silicone Rubber, Modern Plastics, December, 1946.